United States Patent

[11] 3,616,919

| [72] | Inventors | Henry A. Feddern;<br>John A. Sabol, both of Yonkers, N.Y. |
|---|---|---|
| [21] | Appl. No. | 818,180 |
| [22] | Filed | Mar. 26, 1969 |
| [45] | Patented | Nov. 2, 1971 |
| [73] | Assignee | Precision Valve Corporation<br>Yonkers, N.Y. |

[54] WATER PURIFIER
6 Claims, 4 Drawing Figs.

| [52] | U.S. Cl. | 210/169,<br>210/221 |
|---|---|---|
| [51] | Int. Cl. | E04h 3/20 |
| [50] | Field of Search | 210/169,<br>44, 221 |

[56] References Cited
UNITED STATES PATENTS

| 2,669,440 | 2/1954 | Lindenbergh | 210/221 X |
|---|---|---|---|
| 2,748,075 | 5/1956 | Hovlin | 210/169 |
| 3,516,544 | 6/1970 | Sesholtz | 210/169 |

Primary Examiner—Reuben Friedman
Assistant Examiner—T. A. Granger
Attorney—Davis, Hoxie, Faithfull & Hapgood ABSTRACT: A device for treatment of aquarium water provides for water circulation and aeration and provides for removal of organic matter by capturing particles of organic matter on the surface of rising air bubbles. The bubbles form a foam which is discarded.

PATENTED NOV 2 1971

3,616,919

Inventors
Henry A. Feddern
John A. Sabol
By Davis, Hoxie, Faithfull & Hapgood
Attorneys

WATER PURIFIER

The present invention provides a device for purification of water in aquaria or pools for fish. It is particularly suitable for salt water aquaria. The device causes circulation of water, dissolves air into the water, and removes carbon dioxide and particulate matter such as organic wastes.

The aquarium includes organic wastes, excess food, and small organisms including algae. Unless removed, these particulate and dissolved organic materials tend to degrade the clarity of the water and may foul it to a degree harmful to the fish.

Filtering has been employed in attempts to remove the particulate organic matter and to clarify the water. The sizes of the particles of such organic matter extend down into the colloidal range and are thus difficult to remove by entrapment in a filter mesh because the smaller particles will pass through most filters. Filters having colloidal size particle entrapment capability necessarily clog rapidly and thus require frequent replacement. Filters coarse enough to operate for a reasonable period of time are incapable of arresting the smaller particles of organic matter.

A better approach to water treatment is to collect the undesired matter in a medium which is discarded. It is known that such organic matter can be attracted to and adhered to rising air bubbles of sufficiently small size. Such rising bubbles can be made to form a floating layer of foam which retains and concentrates the particulate and dissolved matter. The foam is collected and discarded. Such devices are called protein skimmers and examples are illustrated in German Gebrauchsmustern Nos. 1,203,529 and 1,929,806.

SUMMARY OF INVENTION

The present invention is an improved water purifier particularly suited for salt water aquaria where splashing and air bubbles breaking at the surface lead to the formation of an undesirable coating or rime of salt crystals on adjacent surfaces.

According to the present invention, the extraction of foreign matter is effected in a purification tower vertically disposed in the aquarium and attached at its lower end to a gravel bed filter by means of a tubular fitting.

The gravel bed filter comprises a reticulate plane spaced from the aquarium bottom. A layer or bed of gravel, sand, or crushed stone lies on the upper surface of the plane. By extracting water from below the plane through the tubular fitting, aquarium water is caused to filter down through the gravel layer and a portion of the particulate matter in the aquarium water is entrapped in the gravel layer. Limestone gravel is useful in maintaining the water at a normal pH factor.

The upper end of the tower protrudes above the aquarium water level and includes air inlet fittings and an exhaust fitting for carrying off the foreign matter into a convenient removable receptacle. Inside the tower, a tube connected to one of the air inlets extends downwardly a substantial distance and is capped at its lower end by a block of porous wood such as basswood. When air pressure is applied to this tube, the air emerges through the fine pores of the block in the form of a dense mass of very tiny bubbles which rise in a cloud to the surface of the water in the tower.

Inside the tower and extending nearly to the bottom thereof is an airlift pump which comprises water circulation and air tubes. The air tube is attached to the other air inlet. This air tube is open at the bottom end proximate the bottom of the larger water circulation tube. The water circulation tube is attached to the tower base and is in communication with the open space beneath the gravel bed filter. The length of that tube is such that its upper open end terminates a short distance below the normal water level of the aquarium. When air pressure is applied to the air tube, air flows from the bottom thereof to form relatively large bubbles which rapidly rise within the larger water circulation tube. The rising air bubbles cause an upward water current in the water circulation tube. This causes water to be drawn from beneath the gravel bed filter and thereby causes the water in the aquarium to be drawn down through the gravel layer of the gravel bed filter thereby trapping some of the matter in the gravel.

As water emerges from the top of water circulation tube of the airlift pump, it flows downwardly to the bottom of the tower against the rising cloud of tiny bubbles from the porous block. The water then leaves the tower through vent passages in the tower base to reenter the main body of aquarium water. As the water traverses down the tower past the rising bubbles, waste organic matter adheres to the bubbles and is swept by the bubbles to the top of the tower. The bubbles collect at the top of the water column in a layer of floating foam. The waste matter becomes concentrated in the foam. The foam containing the concentrated waste is expelled through an exhaust fitting into a receptacle.

A purification device which involves splashing, breaking bubbles or foam is unsatisfactory when used in salt water aquaria because of the problem of salt rime accumulation which causes rapid deterioration of metals and creates an unsightly appearance in and about the aquarium.

In view of the foregoing, it is the principal object of the present invention to provide a simple economical device, preferably primarily made of plastic material which may be inconspicuously installed in an aquarium to automatically circulate, clarify, and oxygenate the water of aquaria.

Another object is to greatly retard the accumulation of damaging organic waste products in an aquarium.

Other objects and structural details will become apparent from the following description when read in view of the accompanying drawings wherein.

MECHANICAL DESCRIPTION

Figure 1:
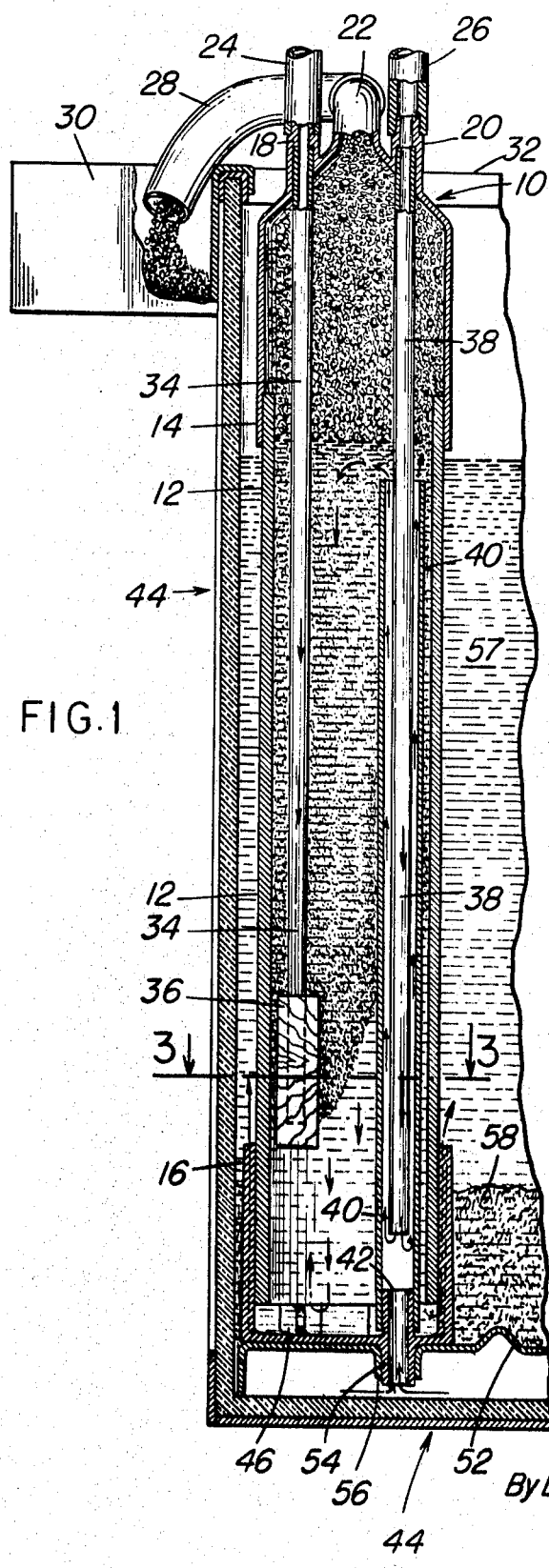
FIG. 1 is a fragmentary sectional elevational view of a device according to the present invention, taken on the line 1—1 of FIG. 3.
Figure 2:
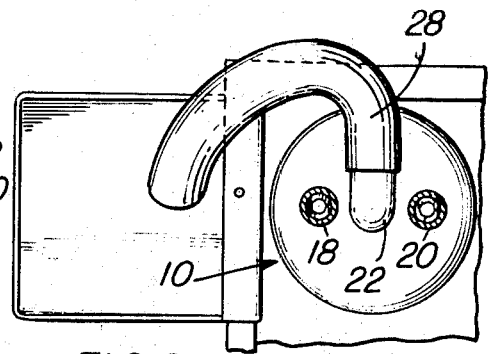
FIG. 2 is a fragmentary plan view of a device according to the present invention installed in an aquarium.

Referring to the drawings, the purification tower 10 is conveniently made in three major pieces; namely, a tubular body 12, a tower cap 14 pressed onto the upper end of the body, and a tower base 16 pressed onto the lower end of the body. Extending upwardly from and formed integrally with cap 14 are two hollow inlet fittings 18 and 20 for oxygenating gas such as air, oxygen, or ozone, and a foam exhaust fitting 22. Air delivery tubes 24 and 26 are attached to fittings 18 and 20 respectively. Attached to exhaust fitting 22 is a waste overflow tube 18 leading to a waste receptacle 30 which may be suspended from the upper rim 32 of tank 44. Fitted into a counterbore in the lower portion of fitting 18 of cap 14 is an aerator air tube 34 which, when assembled in the tower extends nearly to the bottom thereof. A block of porous wood such as basswood 36 is bored across its grain and through most of its length. The free end of tube 34 is frictionally fitted into the bore. Fitted into a counterbore in the lower portion of fitting 20 of cap 14 is another air tube 38 which also extends nearly to the bottom of the tower concentrically within an outer water circulating tube 40. Concentric tubes 38 and 40 cooperate to form an airlift pump for water circulation. Tube 40 is pressed onto a hollow nipple fitting 42 extending upwardly from the bottom of tower base 16. The inside diameter of tube 40 is sufficient to provide an annular space about air tube 38 around which it is disposed when the tower is assembled. Water circulating tube 40 is of such length that its upper free end terminates a short distance below the water level in the aquarium 44.

Figure 3:
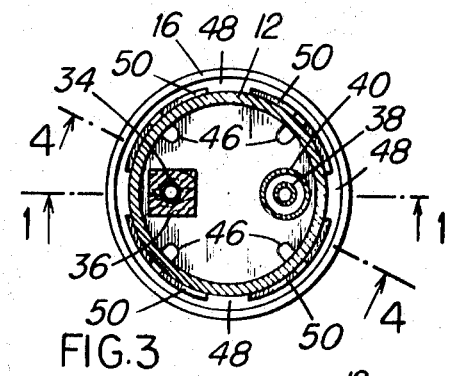
FIG. 3 is a plan sectional view taken on line 4—4 of FIG. 1.
Figure 4:
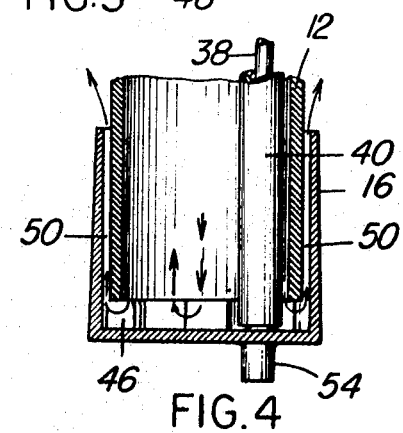
FIG. 4 is a fragmentary view similar to the lower portion of FIG. 1 but taken on the line 4—4 of FIG. 3 to show the water passage around the bottom of the main cylinder of the tower.

A plurality of lands 46 are provided in the tower base 16 to maintain clearance between the lower rim of tubular body 12 and the tower base 16. Referring particularly to FIG. 3, a plurality of vertically disposed splines 48 are provided to frictionally attach the base member 16 to the lower part of tubular body 12 and to provide between them clearance passages 50 through which the purified water escapes into the main body of water in the aquarium.

The assembled tower is attached to a gravel bed filter plane 52 disposed on the aquarium bottom 44 and covered by a layer of gravel 58. Hollow nipple fitting 54 fits into a female socket fitting 56 in the gravel bed filter. Tubular adapter bushings can be employed to adapt fitting 54 to other sizes of gravel bed filter sockets.

By utilizing plastic tubing for body tube 12, air tubes 34 and 38, and water circulating tube 40, a set of tubes may be provided to accommodate a deep tank. It is a relatively simple matter to cut the tubes to suit shallower tanks. The tower cap 14 and tower base 16 are preferably plastic injection moldings.

OPERATION

The operation of the present invention is extremely simple and efficient in that air pressure is applied from a convenient source (not shown) to conduit tubes 24 and 26. The air or other oxygenating gas delivered through tube 24 travels through aerator tube 34 and is forced through the tiny pores of porous block 36 from which it emerges in the form of a cloud of tiny bubbles which rise slowly in the water contained in tower 10.

The air fed through supply tube 26 to water-circulating tube 38 emerges from the lower free end of tube 38 in the form of relatively large bubbles which rise rapidly inside tube 40 to create an upward flow of water within tube 40. This causes water in the open area beneath gravel bed filter plane 52 to be drawn upwardly into tube 40 to emerge from the top thereof into the interior of tower 10. The inflowing water raises the level of water in the tower to above that of the aquarium. This causes the water in the tower to gravitate to the bottom and exit through clearance passages 50 between base 16 and tube 12. Because the water is drawn from beneath the gravel bed filter, water is consequently drawn down through the gravel 58 thereby trapping solid materials to prevent their recirculation through the purification tower.

The purification operation is effected by the downward passage of water flowing from the top of tube 40 and downwardly against the rising frothy mass of bubbles emanating from the aerator block 36. As the water descends in the tower, the organic materials therein adhere to the rising bubbles and collect in foam on top of the water in the tower 10. The foam tends to persist longer as the waste concentration increases. When the waste concentration is sufficiently high, the foam will rise until it eventually overflows through exhaust fitting 22 and waste overflow 28 into waste receptacle 30 from which the concentrated waste may be periodically removed.

The purification tower of the present invention can be used without a gravel bed filter. Aquarium water 57 is permitted to directly enter the tower from near the bottom of the aquarium through the hollow fitting 54.

The purpose of the airlift pump structure 38, 40 is to provide for waterflow through the tower. It is apparent that the airlift pump air tube 38 may be eliminated or removed where the tower is connected to an external circulating system. Ordinarily this is accomplished by connecting the output of a circulating pump to hollow fitting 54 or by providing a water inlet in the upper region of the tower structure. It is preferable to introduce the water to the upper portion of the tower and to cause it to exit from the tower base passages 50 so as to cause the water to flow counter to the rising cloud of bubbles from the aerator block 36.

The present invention is particularly useful with salt water aquaria because bubbles or foam breaking at the surface or the splashing of water returned to the surface of salt water aquaria cause the deposition of salt crystals on nearby surfaces. Such crystals form an unsightly rime of salt which is injurious to metals. The aquarium glass walls at the water interface also become coated with salt rime in aquaria having free bubbling or splashing devices. With the present invention all water is extracted and returned to the aquarium below the surface and all bubble breaking, splashing and foam is confined within the tower 10. Salt rime and organic waste films are prevented.

We claim:

1. An aquarium water-purification device comprising a vertical body tube for placement in an aquarium extending from above to a substantial distance below the intended water level, said tube containing a first conduit for pressurized oxygenating gas terminating in the lower portion of the body tube in a porous aerator device for the formation of small air bubbles resulting in a floating foam within the body tube, a second conduit for pressurized air terminating in an exit orifice for the formation or larger bubbles located near the lower interior portion of the body tube, a vertical water circulation tube interior of the body tube having its lower end in the lower portion of the body tube in open communication with the second air conduit and with the aquarium water external of the body tube and having its upper end terminating in the upper portion of the body tube, the second air conduit and the water circulation tube cooperating to create an upward flow of water induced by the larger bubbles from the aquarium into the upper portion of the body tube, means including passages to return water from the lower portion of the body tube to the aquarium, and means to collect the floating foam created by the aerator device.

2. An aquarium water-purification system comprising a purification tower, a gravel bed filter, water circulation means, and a source of oxygenating gas under pressure, said purification tower comprising a vertical body tube for replacement in an aquarium extending from above to a substantial distance below the intended water level having a water inlet to an upper region of the tower and a water outlet in a lower region of the tower in subsurface communication with the aquarium water, a porous aerator for formation of bubbles and floating foam within the tower, said aerator being connected to the gas supply and located within a lower region of the tower, and means to collect the floating foam, said gravel bed filter comprising a reticulated plane spaced from the bottom of the aquarium adapted for supporting a layer of gravel, the space below the plane being in communication with the purification tower inlet, said water-circulation means being connected to cause water from the aquarium to flow down through the gravel bed filter, thence up into said inlet in the upper region of the purification tower, downward in the interior of the tower, and to return to the aquarium through the subsurface outlet of the tower.

3. The system of claim 2 wherein the water-circulation means is a pump having an outlet conduit in communication with an upper region of the purification tower.

4. The system of claim 2 wherein the tower water inlet and water-circulation means comprise a vertical water-circulation tube in communication with the space below the gravel bed filter, the upper end of said circulation tube terminating in an upper region of the tower, and a conduit leading from said gas supply terminating in an exit orifice in a lower portion of said water circulation tube whereby rising bubbles of gas induce an upward flow of water in said circulation tube to supply water to the tower inlet.

5. A marine aquarium purification tower for placement in an aquarium extending from above to a substantial distance below the intended water level comprising a vertical tubular body, a base cap member, and a top cap member, said base cap member including outlet passages for the subsurface exhausting of purified water from the tower to the aquarium, said body tube containing in a lower portion thereof a porous aerator device for the formation of a cloud of rising air bubbles, a portion of which persist as a floating foam on the surface of the water within the tower and including in an upper portion of the tower an inlet for water from he aquarium, said top cap including an air inlet conduit in communication with said aerator device and an outlet through which foam may be exhausted.

6. The purification tower of claim 5 wherein the water inlet to the tower is an airlift pump within the tower comprising an air supply tube terminating in a lower portion of the tower and a vertical water-circulation tube having its upper end terminating in an upper portion of the tower and having its lower end in the lower portion of the tower and in open communication with the aquarium water and the termination of the air supply tube whereby bubbles of air from the air supply tube rise within the water-circulaton tube to induce an upward flow of water through the water circulation tube.

PO-1050
(5/69)

UNITED STATES PATENT OFFICE
CERTIFICATE OF CORRECTION

Patent No. __3,616,919__   Dated __November 2, 1971__

Inventor(s) __Henry A. Feddern and John A. Sabol__

It is certified that error appears in the above-identified patent and that said Letters Patent are hereby corrected as shown below:

Claim 2, line 35, "replacement" should be --placement--

Claim 5, line 2 of column 5 "he" should be --the--

Signed and sealed this 18th day of April 1972.

(SEAL)
Attest:

EDWARD M. FLETCHER, JR.
Attesting Officer

ROBERT GOTTSCHALK
Commissioner of Patents